Nov. 1, 1966

R. E. HOVDA ETAL 3,283,322

MONOPULSE RECEIVER APPARATUS

Filed Feb. 13, 1963

INVENTORS
ROBERT E. HOVDA
SAM H. WONG
BY

ATTORNEY

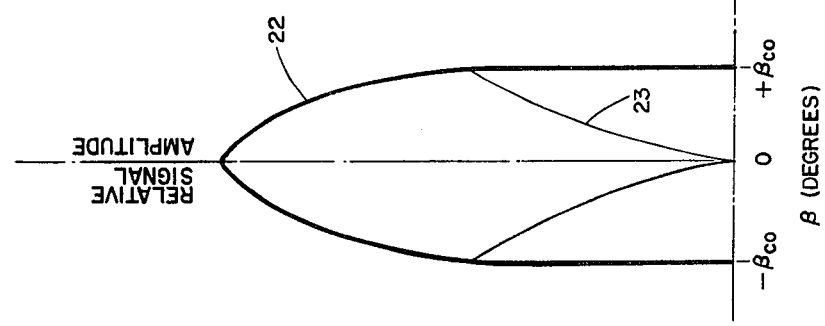
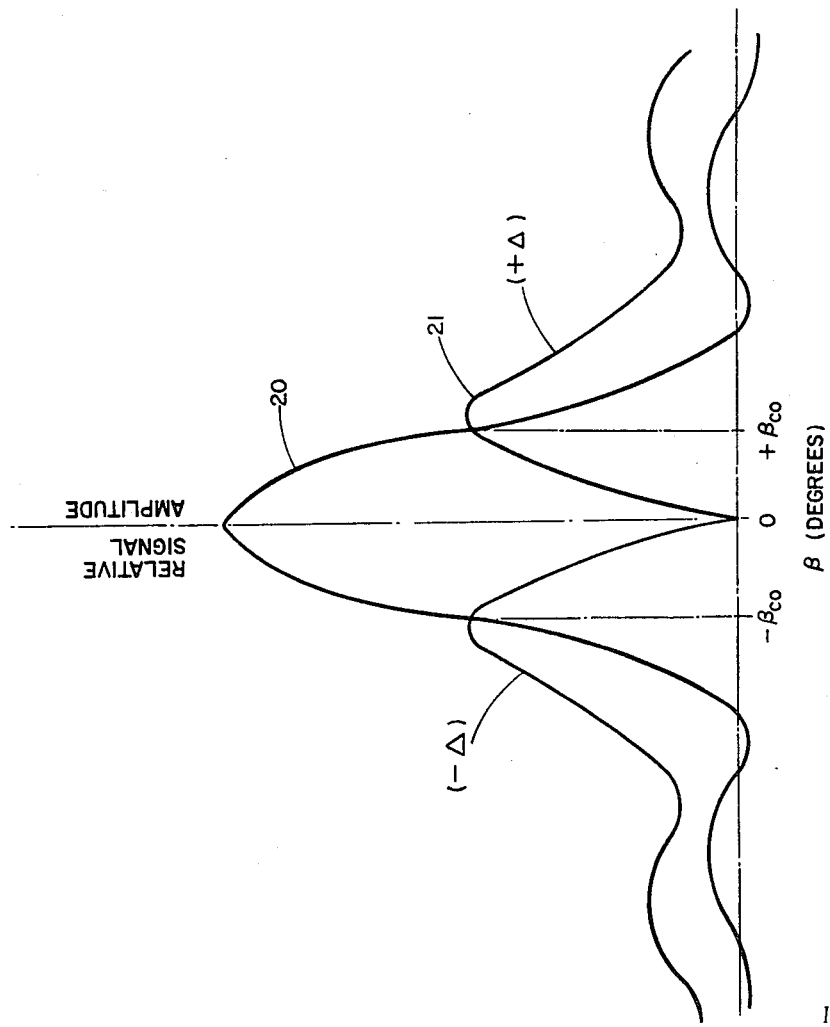

INVENTORS
ROBERT E. HOVDA
SAM H. WONG
BY
ATTORNEY

United States Patent Office 3,283,322
Patented Nov. 1, 1966

3,283,322
MONOPULSE RECEIVER APPARATUS
Robert E. Hovda, Yorba Linda, and Sam H. Wong, Los Angeles, Calif., assignors to North American Aviation, Inc.
Filed Feb. 13, 1963, Ser. No. 258,183
5 Claims. (Cl. 343—16)

This invention relates to an improved monopulse receiver, and more particularly to improved means in a monopulse receiver for suppressing receiver response to antenna side-lobe characteristics.

Monopulse systems for measuring the target angle or angle-off-boresight of a detected target (situated within the antenna beamwidth) in a given plane containing the antenna boresight axis or a radiation axis of symmetry, employ an antenna having at least two apertures to provide two received signals. Also employed are conventional sum-and-difference monopulse receivers responsive to the sum of and the difference between the two received signals to provide a target angle signal indicative of the angle of a detected target off the antenna boresight axis. The sum signal itself is ordinarily used for target display purposes.

In the design of such monopulse receiver systems, the apertures of a prior art conventional antenna usually have a rectangular shape and provide a uniform field distribution across the apertures. Such a rectangular aperture normally provides more than a single null in the response of the difference signal as a function of target angle-off-boresight which produces certain anomalies in the determination of the target angle-off-boresight from such signal. For example, the detection of a target lying within the side-lobe response of an antenna may result in the generation of target angle signals falsely indicating a target angle-off-boresight lying within the angular width of the antenna main lobe response. Further, such rectangular aperture normally has a substantial associated side-lobe pattern or response. Antennas having such antenna side-lobe response or radiation pattern provide illumination of targets lying within such side-lobes, and are, therefore, sensitive to energy either reflected from such illuminated target or transmitted by another or interfering source of energy such as a jamming device within such side-lobe.

In the case of a scanning antenna (e.g., an antenna which is caused to cyclically rotate or oscillate mechanically through a nominal angular sector as in the case of an antenna scanning in azimuth) employing such rectangular aperture, such side-lobe response of the conventional rectangular aperture results (in a PPI display, for example) in "ghosting" or the display of several images at a common range displaced in azimuth from the true image produced by the main lobe of the antenna, thereby reducing target resolution in azimuth. For example, as such antenna scans from left to right, the right side lobes will first illuminate a given target as to provide false position data indicative of target position within the main lobe (e.g., to the left of the actual target position); then as the scan continues, the main lobe illuminates the target to provide correct position data. Finally, as the scan continues, to the right, the main lobe moves off the target and the left lobe illuminates the target to provide false position indicative of a target position to the right of the actual target position. A similar result occurs in elevation due to relative target motion (change in elevation angle-off-boresight due to a utilizing-vehicle such as an aircraft rapidly approaching stationary prominences as in a terrain-mapping mode, for example).

Further, in the case of multiple targets, each lying within the antenna beamwidth or antenna response pattern, present monopulse techniques cannot readily resolve one such target from another. If such targets are separated in range, then conventional range gating techniques may be applied to distinguish such target, even though both exhibit a common target-angle-off-boresight. However, where several such targets exist within the antenna beamwidth or antenna response pattern and at a common range, although separated in target-angle-off-boresight, range-gating techniques are ineffective to allow distinguishing or resolving one target from another. In the case of a ground-mapping mode or other mode employing a downward-looking antenna, the ground clutter effect represents an ultimate multiple target situation which particularly points up the difficulty of distinguishing a particular target lying within the response pattern, including side-lobe response of a particular antenna.

The concept of the subject invention provides means for both narrowing the effective beamwidth of the antenna main lobe and suppressing the side lobes of an antenna response pattern, thereby improving target resolution and reducing sensitivity to clutter.

In a preferred embodiment of the subject invention there is provided a monopulse receiving system including an antenna having at least two apertures for receiving signals, and providing a first output signal indicative of the sum of the received signals and a second output signal indicative of the difference between the received signals and having only one null as a function of target-angle-off-boresight. These received monopulse output signals are fed to signal utilizing means. There is further provided comparison-logic means responsive to the first and second output signals of the monopulse antenna for providing a control signal indicative of the difference therebetween. Signal gating means responsive to such control signal are interposed between the receiving antenna output and the signal utilizing means for gating the inputs to the signal utilizing means.

By means of the above described arrangement, the received signals occurring due to targets having associated target angles-off-boresight greater than a predetermined value are suppressed. Hence, target resolution between multiple targets is improved, sensitivity to clutter is reduced, and antenna side-lobe response is suppressed. Further, because of the increased directivity of the invention, the susceptibility to jamming is reduced or improved. Accordingly, it is a general object of the subject invention to provide improved monopulse receiving apparatus.

It is also an object of the subject invention to provide means for improving the target resolution of a monopulse receiver.

It is another object of the subject invention to provide means for suppressing the side-lobe response of a monopulse receiver antenna.

It is a further object of the subject invention to provide means for reducing "ghosting" and like undesired target signal effects in a monopulse receiver.

It is still another object of the subject invention to provide a narrower effective beamwidth response in a monopulse receiver.

These and other objects of the invention will become apparent from the following specification, taken together with the accompanying drawings, in which:

FIG. 2 is an illustration of a preferred sum-and-difference antenna radiation pattern for the antenna in FIG. 1.

FIG. 3 is an illustration of an exemplary response of the system in FIG. 1 to the antenna pattern of FIG. 2.

In the figures like reference characters refer to like parts.

Figure 1:
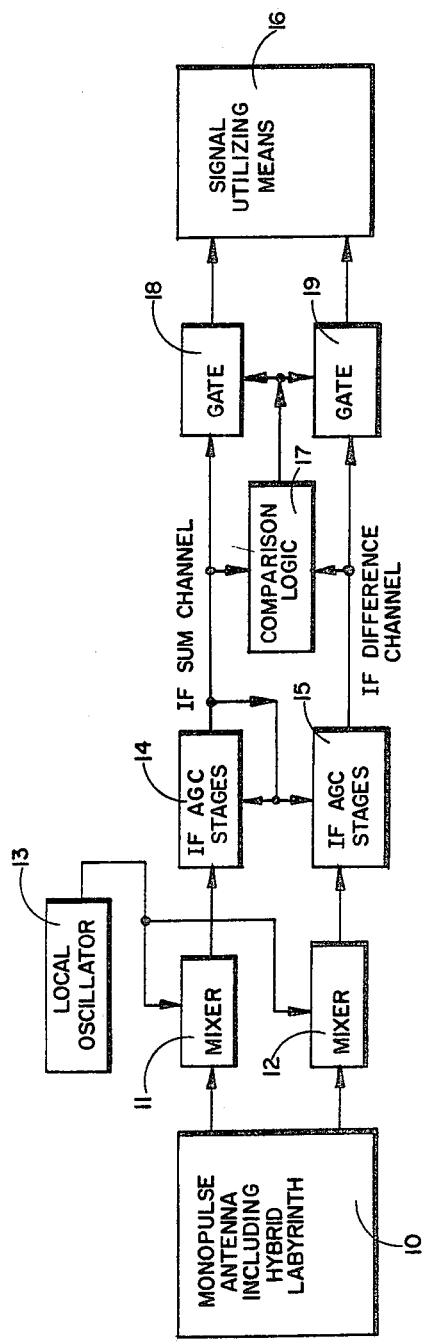
FIG. 1 is a block diagram of a system embodying a concept of the invention.

Referring now to FIG. 1, there is illustrated a block diagram of a monopulse system embodying a concept of the invention. There is provided a monopulse antenna 10 having at least two apertures and including microwave circuitry such as a hybrid junction for providing a first output signal indicative of the sum of two received signals and a second output signal indicative of the difference between such received signals. The construction and arrangement of an exemplary hybrid junction for such purpose is shown, for example, in U.S. patent application 709,729, filed January 16, 1958, now Patent No. 3,071,769, for a Four-Horn Feed Bridge, and assigned to North American Aviation, Inc., assignee of the subject invention. The antenna is arranged to limit the sum signal response relative to the difference signal response as a function of the angle-off-boresight of a source of received signals, in a manner to be described more fully hereinafter. Accordingly, antenna 10 is shown for convenience in block form only in FIG. 1.

There is also provided a sum channel microwave mixer 11 and difference channel microwave mixer 12 interposed in the sum and difference channels respectively, and responsively connected to a local oscillator 13 for providing IF signals indicative of the respective microwave outputs of the hybrid junction of element 10. Elements 11, 12 and 13 are all constructed and arranged to cooperate by means well-known in the monopulse art and are, therefore, shown in block form only. Such construction and arrangement are described with particularity, for example, in U.S. Patent 2,933,980 for An Integrated Aircraft and Fire Control Autopilot, issued April 26, 1960, to J. R. Moore et al.

The IF sum and difference output signals from mixers 11 and 12 are fed to respective ones of automatic gain control (ACG) amplifiers 14 and 15, the control inputs of which are commonly connected to the output of IF sum channel AGC amplifier 14. Hence, the gains of amplifiers 14 and 15 are commonly controlled as inverse functions of the sum channel output level from amplifier 15. In this way, the level of the sum channel signal is made constant, as to be invariant with the signal strength variations of a received signal, such as occurs with variations in the range of a given target. Further, the IF signal output from a difference channel AGC amplifier 15 is thus normalized as an inverse function of the sum channel signal level; hence, the output of AGC amplifier 15 provides a ratio signal representing the ratio of the difference signal to the sum signal. Such ratio signal is indicative of the target angle-off-boresight and is independent of the range distance of the detected target. The construction and arrangement of AGC units 14 and 15 are well known to those skilled in the art. Therefore, elements 14 and 15 are shown in block form only.

There is further provided in FIG. 1 signal utilizing means 16 responsively connected to the outputs of the sum and difference channels for utilizing the sum and difference signals. The structure of signal utilizing means 16 is not critical to the concept of the invention and, therefore, is shown in block form only.

Comparison logic means 17 is responsively connected to the output of the sum and difference channel amplifiers 14 and 15 for providing a two-state control signal indicative of the difference between the sum and difference output signals. Comparison logic means 17 may be comprised, for example, of a comparator circuit of the type illustrated in FIG. 6.27a at page 298 of "Electronic Analog Computers (second edition) by Korn and Korn, published by McGraw-Hill (1956). The operation of such a device requires that the two signals being compared be unipolar signals of mutually opposed polarities. Accordingly, oppositely-poled diodes would be employed in the respective inputs of the comparator circuit, in a manner well-understood in the art for converting the IF sum and difference input signals of FIG. 1 to detected signals of mutually opposed sense or polarity. Because the construction and arrangement of comparison logic means 17 is well-known in the art, such element is shown in block form only.

First and second signal gating means 18 and 19 are interposed between the sum and difference channels respectively and an associated input to signal utilizing means 16. The control inputs of gating means 18 and 19 are commonly connected to the control signal output of comparison logic means 17, whereby gating means 18 and 19 are turned "ON" during the interval when the amplitude of the sum signal produced by a detected target is greater than the difference signal produced thereby, and are turned "OFF" during the interval when the signal amplitude of the sum channel is less than that of the difference channel.

The normal operation of the above described arrangement is more easily understood by reference to FIGS. 2 and 3.

Referring to FIG. 2 there are illustrated a preferred sum and difference response as function of angle-off-boresight for the radiation pattern of the monopulse antenna 10 of FIG. 1. It is to be understood from the theorem of reciprocity that such radiation pattern, whose sum and difference response is illustrated in FIG. 2, also corresponds to the antenna response pattern to received signals. Curve 20 in FIG. 2 illustrates the sum of the responses of two antenna apertures of a monopulse antenna to received target signals as a function of target angle, while curve 21 illustrates the difference between the responses of the two antenna apertures. It is to be observed that the sum response curve 20 is an even function of $\beta$, and demonstrates a main lobe or peak about the boresight axis (e.g., angle-off-boresight, $\beta$, equal to or nearly equal to zero), which response rapidly attenuates as angle-off-boresight, $\beta$, increases.

The difference response curve 21 in FIG. 2 is an odd function of $\beta$ (e.g., changing sense as $\beta$ changes sense), the amplitude image to the left of $\beta=0$ (e.g., minus values of $\beta$) being plotted without indicating the associated sense reversal. Difference response curve 21 demonstrates a single null or zero amplitude at the boresight axis ($\beta=0$), the amplitude of the difference response equalling that of the sum response at a cross-over amplitude of angle-off-boresight (e.g., $\beta=\beta_{co}$).

Now, since the comparison logic means 17 in FIG. 1 is responsive to the sum and difference channels signals to turn "ON" gates 18 and 19 only when the amplitude of the difference signal is less than that of the associated sum signal indicative of a detected target, then the antenna response of FIG. 2 beyond the target angle region, 0 to $\pm\beta_{co}$, for antenna 10 is suppressed. No signal is thus gated into signal utilizing means 16, FIG. 1. Accordingly, the response pattern of FIG. 2 is effectively reduced to that of FIG. 3.

Referring to FIG. 3, there is illustrated the effective response as a function of $\beta$ of the system illustrated in FIG. 1. Curves 22 and 23 represent curves 20 and 21 respectively (of FIG. 2) for target angle magnitudes up to $\pm\beta_{co}$, and then fall to zero amplitude for target angle amplitudes larger than $\beta_{co}$.

Hence, it is to be appreciated that the device of FIG. 1 provides target angle gating of detected targets, whereby the side-lobe response of the monopulse antenna is suppressed, and the main lobe beamwidth of the antenna response is narrowed.

Although the IF AGC stages in the illustrated embodiment of FIG. 1 are not necessary to the concept of the invention, yet the normalization of the received signals in such manner has a particular advantage to the device of the invention. The unusual mechanization of the comparison logic means 17 of FIG. 1 contains an inherent threshold or response dead band, signal levels lying within which will not operate the device. Hence, the use of the AGC elements 14 and 15 as illustrated in FIG. 1 provides that the response of comparison logic means 17 will be independent of target signal level and a function only of the relative signal levels between the sum and the difference channel signals (e.g., determined by $\beta_{co}$ of FIG. 2).

It is to be appreciated that the useful and improved result of the device of FIG. 1 obtains from the singularity of the difference channel null response, occurring (in FIG. 2) only at $\beta=0$ for antenna 10, whereby a cross-over of the sum and difference response curves of FIG. 2 occurs only once for target angles of a given sense (e.g., at $-\beta_{co}$ for negative target angles, and at $+\beta_{co}$ for positive target angles). Hence, no ambiguity will exist in the operation of logic comparison means 17 to alter the system response as illustrated in FIG. 3. In other words, the improved response of FIG. 3 results from the co-operation of logic means 17 with the performance characteristic of antenna 10 as described in FIG. 2.

Figure 4:
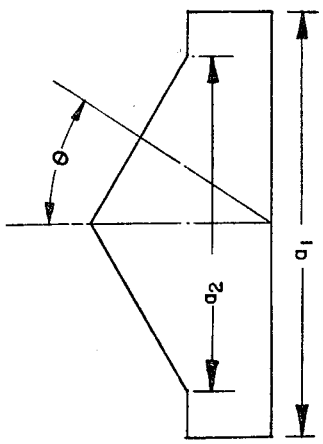
FIG. 4 is an illustration of a preferred field distribution pattern for the apertures of the antenna of FIG. 1.

A combined antenna aperture distribution producing the desired single difference pattern is shown in FIG. 4.

Referring to FIG. 4, there is illustrated a combined antenna aperture field distribution (or radiation pattern) for achieving a difference pattern having the desired single null (as shown in FIG. 2). Such aperture distribution, as illustrated, has a horizontal extent or dimension corresponding to a (horizontal) plane for which target (azimuth) angle data is desired. The shape of the distribution resembles a gable symmetrically superimposed and resting upon a rectangle, the peak of the gable lying on an axis of symmetry normal to the plane of interest for which target angle data is desired. The angle $\theta$ in FIG. 4 defines the slope of the gable, in measuring the angular deviation of a normal to the gable from a perpendicular. It is to be appreciated that for the special case where $\theta$ equals zero, the shape of FIG. 5 would resemble a conventional rectangular aperture distribution, which rectangular shape is here sought to be avoided.

The control of an electromagnetic field distribution by physical shaping of the area of an antenna reflector or physical shaping of the antenna feed horn apertures or the manner of correction of the dipole elements of a flat plate monopulse antenna are well known. A discussion of the subject of aperture illumination and associated antenna patterns is contained in chapter 6 of "Antenna Theory and Design" by Silver (volume 12 of the Radiation Laboratory Series), published by McGraw-Hill (1949). Section 6.5 of chapter 6 discusses rectangular apertures; and Table 6.1 on page 187, for example, describes the characteristics of various types of aperture distributions achieved by tapering the antenna illumination. Accordingly, desired field distribution (or radiation pattern) shown in FIG. 4 may be achieved by the use of physical apertures or antenna horns of the gabled shape shown in FIG. 5, or by selecting a particular shape and size antenna reflector associated with the antenna feed horns. Also the combination of shaping both the physical feed horns and the antenna reflector can be made to produce the resultant field distribution of FIG. 4, whereby the single-null difference pattern of FIG. 2 is achieved. Another means for achieving such an aperture distribution is to employ a flat plate antenna having a uniform array of dipoles or plurality of radiating elements which are connected, or excited, to generate such a desired radiation pattern.

Figure 5:
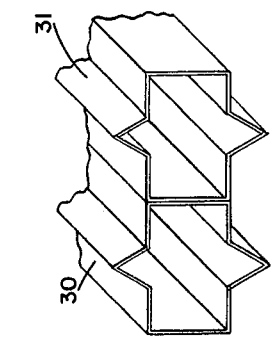
FIG. 5 is an illustration of a preferred embodiment of an array of apertures for the antenna of FIG. 1.

Referring to FIG. 5 there are illustrated the torn-away sections of a preferred embodiment of two adjacent apertures 30 and 31 of a monopulse feed horn array for providing two received signals. Mutually adjacent physical apertures 30 and 31 are horizontally oriented or arrayed for providing two received signals, the difference between which is thus indicative of an azimuth component of target angle-off-boresight. Each of apertures 30 and 31 is symmetrical, having a gabled section disposed at the top and bottom of such aperture. Because the horizontal field distribution across each of apertures 30 and 31 resembles that illustrated in FIG. 4, the sum and difference of the received signals from apertures 30 and 31 resemble those illustrated in FIG. 2.

Although the illustrated horizontal array in FIG. 5 is adapted to cooperate with difference signal means to provide azimuth target angle signals, it is to be understood that the array may be rotated about an axis of symmetry to achieve a vertical array for providing elevation target angle signals. In practice, two separate mutually orthogonal arrays may be employed in the generation of signals indicative of mutually orthogonal components of target angle-off-boresight.

Figure 6:
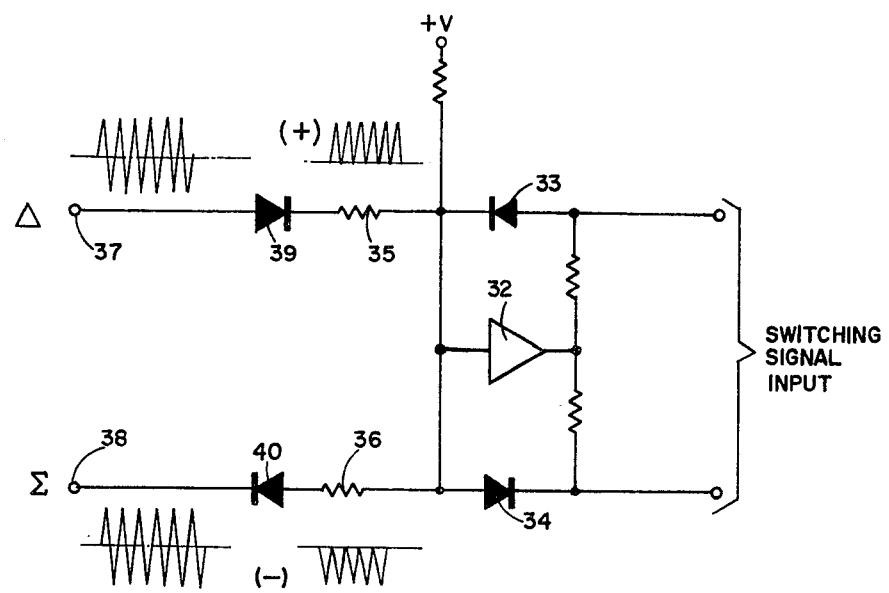
FIG. 6 is a schematic diagram of an exemplary comparator for use in the system of FIG. 1.

A circuit for the comparator of FIG. 1 is shown in FIG. 6.

Referring to FIG. 6 there is illustrated an exemplary circuit for the comparator 17 of FIG. 1 of the type described. The device is basically a feedback-limited high-gain summing amplifier for providing a two-state switching signal output, although other types could be employed. Limiting of amplifier 32 is affected by means of oppositely-poled diodes 33 and 34. Operation of the device relies upon the use of inputs of opposite sense, the sense of the larger of the two inputs determining the state of the output signal. Therefore, interposed between each of input summing resistors 35 and 36 and an associated input terminal 37 and 38 is a diode 39 and 40 respectively. In this way, IF input signals applied to input terminals 37 and 38 are clipped or detected so as to resemble pulsating D.-C. signals of a given polarity or sense. Diodes 39 and 40 are mutually oppositely-poled, whereby the signals applied to summing resistors 35 and 36 are of mutually opposite sense. In this way the sum of the inputs to amplifier 32 from summing resistors 35 and 36 will be indicative of the amplitude difference between such inputs and of a sense determined by the larger of them.

Hence, it is to be appreciated, that means is provided for improving the response of a monopulse signalling system, whereby sidelobe response is suppressed and target resolution is improved.

Although the invention has been described and illustrated in detail, it is to be clearly understood that the same is by way of illustration and example only and is not to be taken by way of limitation, the spirit and scope of this invention being limited only by the terms of the appended claims.

We claim:

1. In a monopulse receiver providing the sum and difference of two received signals, means for gating said sum and difference signals as a function of the relative amplitude of one to the other of said sum and difference signals, comprising a receiving array of a first and second mutually adjacent receiving aperture for providing a first and second received signal respectively, each said aperture having a gabled field distribution characteristic thereacross along the direction of said array.

2. The device of claim 1 wherein said gating means further comprises control means responsive to said sum and difference signals for turning on said gating means only during the interval when said difference signal is less than said sum signal.

3. In a monopulse receiving system,
   a monopulse antenna having a sum and difference output channel for providing sum and difference receiver signals respectively, the apertures of said antenna each having a gabled amplitude distribution thereacross for limiting the sum signal response to one crossover amplitude relative to the difference signal response as a function of the amplitude of target angle-off-boresight;

signal utilizing means for utilizing said sum and difference received signals;

signal gating means interposed between said output channels and said signal utilizing means; and comparison logic means responsively connected to said output channels for turning on and off said signal gating means when the amplitude of the difference signal is less and greater, respectively, than that of said sum.

4. Means for limiting the response of a radar receiver providing sum and difference signals wherein said difference signal is less than said sum signal at angles less than a given angle-off-boresight and are greater than said sum signal for all angles greater than said given angle-off-boresight, comprising means for comparing said sum and difference signals, and means for gating said sum and difference signals in accordance with comparison of sum and difference signals, said gating means comprising a gate connected to receive said sum signal and a further gate connected to receive said difference signal divided by said sum signal.

5. The combination recited in claim 4 wherein said gating means comprises a gate connected to receive said sum signal and a further gate connected to receive said difference signal divided by said sum signal, and said signals are passed through said gates if said difference signal does not substantially exceed said sum signal.

References Cited by the Examiner
UNITED STATES PATENTS

| | | | |
|---|---|---|---|
| 2,456,666 | 12/1948 | Agate et al. | 343—11 |
| 2,687,520 | 8/1954 | Fox et al. | 343—16.1 |
| 3,094,695 | 6/1963 | Jahn | 343—100.12 |

FOREIGN PATENTS

| | | |
|---|---|---|
| 610,664 | 5/1947 | Great Britain. |

OTHER REFERENCES

Jasik: Antenna Engineering Handbook (McGraw-Hill); 1961, pages 2–25—2–30.

Silver: Microwave Antenna Theory and Design (McGraw-Hill); New York, 1949.

CHESTER L. JUSTUS, *Primary Examiner.*

R. E. KLEIN, J. P. MORRIS, *Assistant Examiners.*